Oct. 21, 1952     J. A. ANGLADA     2,614,953
HEAT-SEALING ELEMENT
Filed Feb. 9, 1946
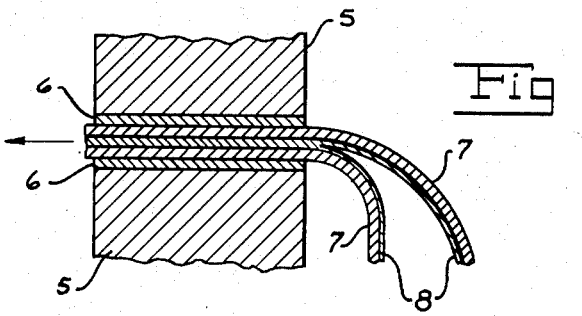
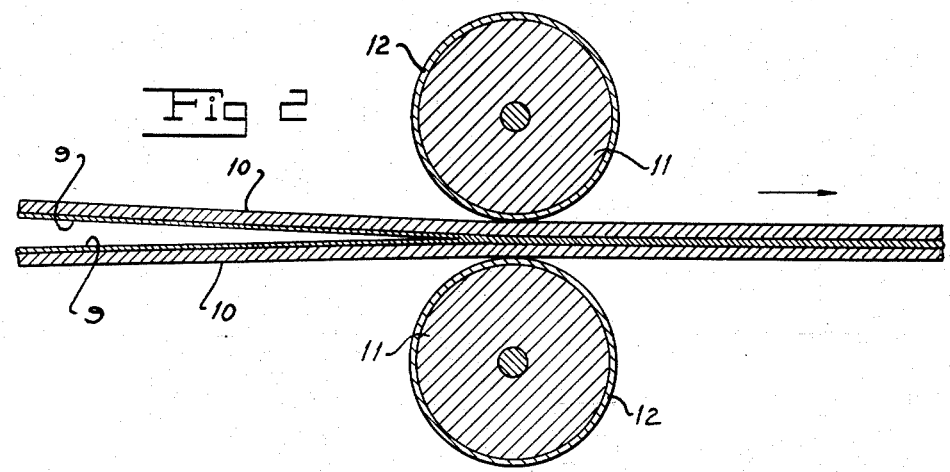
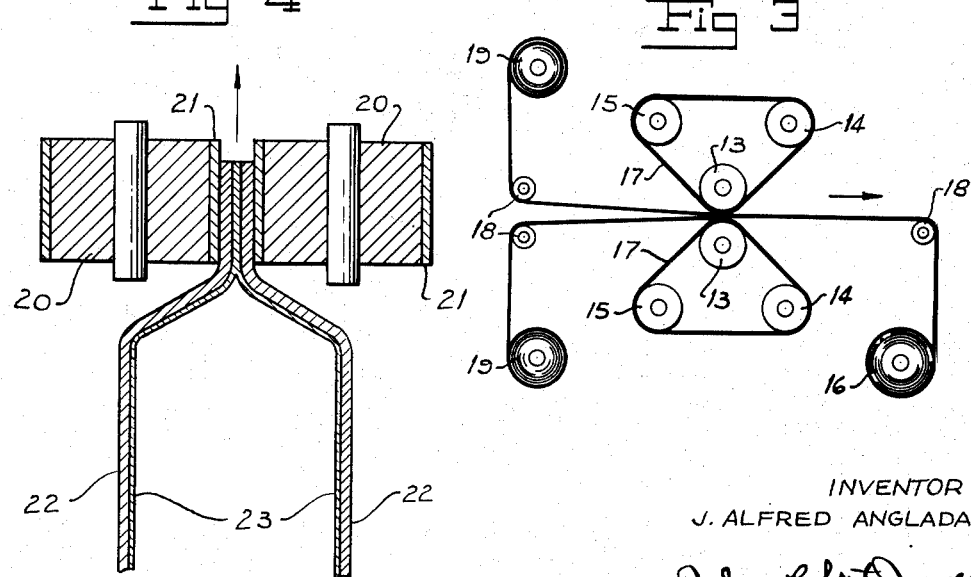
INVENTOR
J. ALFRED ANGLADA
BY John Robert James
ATTORNEY Patented Oct. 21, 1952

2,614,953

UNITED STATES PATENT OFFICE 2,614,953

HEAT-SEALING ELEMENT

Joseph Alfred Anglada, White Plains, N. Y., assignor, by mesne assignments, to American Viscose Corporation, Wilmington, Del., a corporation of Delaware Application February 9, 1946, Serial No. 646,598

7 Claims. (Cl. 154—42)

This invention relates to heat sealing and more particularly to a process and apparatus for heat-sealing sheets formed of, or coated with, thermoplastic materials.

In the wrapping and packaging art, there are employed a number of sheet materials which are formed of, or coated, with a thermoplastic material. Such sheets are formed into bags, tubes, sacks, or other types of containers which are fabricated and sealed after filling by the application of heat and pressure. Frequently, it is necessary to seal a sheet which is of uneven thickness because of the overlapping of edges of the sheet on the seam, or for other reasons. In such cases it is difficult to obtain an effective seal at the point where the joint is thinnest. Moreover, creases which impair the strength of the seam are readily formed in the joint.

In order to avoid this, it is desirable that the surface of the heat-sealing element have a considerable degree of resiliency and plasticity. It has, therefore, been proposed that the heated metal sealing surface be covered with a smooth resilient nonthermoplastic film such as a film of rubber. However, it has heretofore been impossible to find a material with the requisite resiliency which would maintain its resiliency over a long period of time and which would have sufficient heat resistance to withstand the heat-sealing temperature generally employed. The coating materials which have been employed have had a low resistance to heat and have thus had to be replaced after a relatively short interval of use, considerably increasing the expense of the heat-sealing operation.

Now in accordance with this invention, sheet materials formed of, or coated with, a thermoplastic material are heat-sealed to themselves or other materials by applying heat and pressure through a film of a polyorganosiloxane.

The heat-sealing surface of the heat-sealing element may be coated or covered with a sheet of the polyorganosiloxane which may be permanently adhered to the element, if desired. Also, a film of the polyorganosiloxane or a web formed of heat-resistant material, and carrying a coating of sufficient thickness to be resilient of a polyorganosiloxane may be continuously interposed between the heat-sealing surface and the sheet being sealed.

The drawings illustrate various apparatus and modifications of the heat-sealing element in accordance with the invention for carrying out the process for the invention.

Figure 1 is a side elevation in section of a segment of a flat plate heat-sealing element.

Figure 2 is a side elevation in section of a tubular heat-sealing element.

Figure 3 is a diagrammatic view in side elevation of an apparatus for continuously interposing a film comprising a polyorganosiloxane between the heat-sealing surface of the heat-sealing element and the sheet being sealed.

Figure 4 is a side elevation in section of an apparatus for sealing the tops of filled containers.

Sheets which may be heat-sealed in accordance with this invention may be formed of any thermoplastic materials including thermoplastic synthetic resins, thermoplastic cellulose derivatives, thermoplastic synthetic rubber, and mixtures of such materials. Thermoplastic resins which may be employed also include thermosetting resins in a thermoplastic stage which are capable of being fused to form an effective seal. The sheet material which is to be heat-sealed may be formed of a thermoplastic or nonthermoplastic material carrying a thermoplastic coating including a thermoplastic synthetic resin, a thermosetting resin in a thermoplastic stage, a thermoplastic cellulose compound, or a thermoplastic synthetic rubber, on one or both surfaces. Therefore, the invention is also applicable for heat-sealing coated regenerated cellulose, papers of various types such as glassine and kraft, and fabrics. Thermoplastic resins, which may be employed either in formation of the sheet or in the preparation of the coating upon the sheet to be heat-sealed, include:

*Thermoplastic resins*

Polyvinyl chloride
Polyvinylidene chloride
Polystyrene
Copolymers of vinyl chloride and vinyl acetate
Copolymers of methyl methacrylate and vinyl chloride
Polyvinyl butyral
Polyvinyl acetal
Polymethyl methacrylate
Polymethyl acrylate
Polyethylene
Polyamides
Coumarone-indene with rubber oil-modified and unmodified alkyd resins (prepared from dicarboxylic acids)
Phenol-formaldehyde resins (prepared from phenols having only two reactive positions)

Thermoplastic cellulose compounds

Cellulose acetate
Cellulose acetate butyrate
Cellulose acetate propionate
Cellulose propionate
Benzyl cellulose
Ethyl cellulose
Butyl cellulose
Hydroxy ethyl cellulose

Thermosetting resins in a thermoplastic stage

Urea-formaldehyde
Urea alcohol ether formaldehyde
Phenol-formaldehyde (phenols having three reactive positions)
Melamine-formaldehyde
Alkyd resins (prepared from polyhydric alcohols and polycarboxylic acids)
Aniline-formaldehyde
Phenol-furfural
Unsaturated polyesters
Polyallyl alcohol and derivatives
Protein-formaldehyde resins:
    Casein-formaldehyde
    Shellac-formaldehyde

Mixtures of thermoplastic and thermosetting resins

Polyvinyl chloride and urea-formaldehyde-butanol ether
Polyvinyl chloride and phenol-formaldehyde
Polymethylmethacrylate and urea-formaldehyde
Polystyrene and alkyd
Coumarone-indene and alkyd
Polyvinyl acetal and melamine-formaldehyde
Polyvinyl butyral and urea-formaldehyde The term "sheet" as used in the specification and claims is to be understood to include both uncoated and coated sheets. The sheet may have any physical form; it may, for example, be in the form of a tubing, band, ribbon, film, bag, pouch, or other containers.

The polyorganosiloxane which is interposed between the heat-sealing surface of the heat-sealing element and the sheet being sealed should have a softening point above about 150° C. and must be characterized by a retention of compressibility at temperatures of approximately 175° C. for a period of at least 100 hours. Thus, as the film, which is interposed between the heat-sealing surface of the heat-sealing element and the sheet being coated, there may be employed any organic polymeric material which is resilient and flexible and which retains its resiliency and flexibility at a temperature of approximately 175° C. for a period of 100 hours. As such organic polymeric materials, polyorganosiloxanes are preferred. Such polyorganosiloxanes include polyalkyl silicones, polyaryl silicones, polyaroxyaryl silicones, polyaroxyalkyl silicones, polyhalogenated alkyl silicones and polyhalogenated aryl silicones.

The polyorganosiloxane may be applied to the heat-sealing surface of the heat-sealing element in the form of a liquid composition which is hardened or cured in situ to a nontacky stage. It is also possible to adhere sheets of the polyorganosiloxane in a tacky incompletely polymerized stage to the surface of the heat-sealing element and then complete polymerization of the polyorganosiloxane to a nontacky stage at which the silicone resin retains its flexibility and resiliency.

A convenient method of employing the polyorganosiloxane includes extruding the material in the form of a tube, curing the tube to a nontacky stage and then slipping it over the heat-sealing surface of a tubular heat-sealing element. This method of interposing a film of polyorganosiloxane between the heat-sealing element and the sheet being sealed has the advantages of permitting frequent changes of the film for cleaning purposes, where such is required.

Where an endless web of polyorganosiloxane is desired, the material may be coated upon a heat-resistant nonthermoplastic backing sheet to which the polyorganosiloxane shows permanent adhesion. It is preferable to employ a polyorganosiloxane which is in a partially cured tacky stage. Polymerization of the silicone resin is then continued upon the backing sheet until a nontacky stage is reached. Fabrics of Fiberglas, metal bands or screens and similar heat-resistant material are suitable for use as a backing sheet.

The following examples illustrate the application of the invention and are illustrated in the drawings:

EXAMPLE I

The heat-sealing surface of a heat-sealing element 5, as illustrated in Figure 1, such as a flat sealing bar, was provided with a film of polyorganosiloxane by adhering to it a tacky sheet of polyalkyl silicone. Each of the coated jaws of the heat-sealing element were then placed in a female die section which had been dusted with talc and subjected to a pressure of 500 lbs. per square inch at 40° C. for one minute. The jaw was then heated up to 140° C. and held at this temperature for 10 minutes. The mold was cooled to 40° C. with the pressure still on, and the pressure then slowly released. The polyalkyl silicone sheet was still slightly tacky. In order to develop its maximum strength, the heat-sealing element was placed in an oven for one hour at 80° C., one hour at 90° C., two hours at 130° C., and 24 hours at 150° C. The silicone sheet at the end of this period was nontacky while retaining its resiliency and having a minimum of compression set at a temperature of 200° C. The film of polyalkyl silicone had a thickness of $\frac{1}{16}$ inch.

The apparatus of Figure 1 was heated to 175° C. and employed to seal the tops of bags formed of a sheet 7 of regenerated cellulose coated on the inside only with a moistureproofing coating 8 of polyvinylidene chloride, anchored to the regenerated cellulose by an anchoring coating of a melamine-formaldehyde resin. The tops of the bag were folded over thus providing an uneven joint. However, the apparatus gave an excellent seal which was impervious to moisture and air and which resisted rupture. The device shown in Figure 1 is of the type generally used in forming the bottom or top seals of bags, tubes, or other containers whose tops or bottoms may be flattened.

EXAMPLE II

In the apparatus of Figure 2, the heat-sealing elements are in the form of calender rolls 11, one or both of which may be heated by conventional means. The rolls are provided with a film 12, which may be in the form of a seamless tube, formed of polyalkyl silicone.

A seamless tube was prepared by extrusion, the polyalkyl silicone being extruded by passing it once through the extruder prior to the final extrusion. During this operation, the material was kept at 35° C. The extruded tube was then re-extruded at a temperature of 55° C. The tube was cured by baking in an oven for one hour at 80° C., one hour at 90° C., two hours at 110° C., two hours at 130° C., and 24 hours at 150° C. The final product was nontacky and maintained its flexibility up to 260° C. It was not affected by water and was resistant to chemical action.

After slipping the tube over the calender rolls 11, two sheets 10 of regenerated cellulose coated with a wax-nitrocellulose-resin moistureproof coating 9 were heat-sealed to each other. The rolls were heated at 225° C. and the sheets were fed through the nip of the rolls at a rate of 40 feet per minute. The seal produced was quite strong and impervious to air and moisture.

The apparatus of Figure 2 is especially adapted for sealing the ends of pouches and like containers. The apparatus is well suited, for example, for adhering a self-supporting thermoplastic film of synthetic resin such as polyvinyl chloride to a wool or textile fabric. If desired, the film may be nonselfsupporting, carried upon a temporary support.

When desired, only one of the calender rolls need be provided with a covering of polyorganosiloxane.

The apparatus is particularly advantageous when it is desired to heat-seal folded sheet materials to each other. The folds provide different thicknesses of material along the longitudinal length of the sheet being sealed. The resiliency of the polyorganosiloxane film permits the heat-sealing element to exert equal pressure upon the film at both the thick and thin portions, thus heat-sealing all the portions equally without producing creases in the films. Such a result is not possible with heat-sealing elements which are not coated with a flexible material.

A synthetic rubber was coated upon the rolls 11 in the same manner as the polyorganosiloxane illustrated, and the apparatus run continuously for 100 hours at 150° C. The synthetic rubber at the end of this period was hard and brittle and did not give a good seal. In contrast, the tubing of polyorganosiloxane, even after continuous operation for 100 hours, was still soft and showed no compression set at high temperatures. The polyorganosiloxane could be compressed to ⅔ its original thickness, held that way for several hours at 150° C. and when released still returned to 90% of its former thickness.

In an attempt to determine the top operating temperatures of the polyorganosiloxane, comparative tests were made. It was found that the polyorganosiloxane-coated roller could withstand temperatures as high as 300° C. for several days. This compares with a top operation temperature of 85° C. for the same period for natural or synthetic rubbers.

EXAMPLE III

In Figure 3 there is illustrated an apparatus in which a continuous film surfaced with a polyorganosiloxane is interposed between the heat-sealing element and the sheet material being heat-sealed. A glass cloth was coated with a smooth white paste having the consistency of a heavy ointment and comprising a polyalkyl silicone. The coating was applied to the glass cloth by knifing and several layers were added so as to build up a surface film ⅛ to 1/16 inches thick upon the glass cloth. After the application of each layer of approximately 0.003" thickness the coated cloth was then heated at 125–150° C., curing it slowly so as to prevent blistering of the coating. At the end of 24 hours the coating was nontacky and the sheet then ready for use. The curing was done in an oven in the presence of an inert atmosphere of nitrogen.

The coated glass cloth 17 was then affixed around the rollers 13, 14, and 15 so as to travel a triangular path across the surface of the heating rolls 13, the polyalkyl silicone film facing outward. Both surfaces of the glass cloth had a coating of polyalkyl silicone. Two sheets of polyethylene film 19 were then passed around the rollers 18 through the bite of the pressure rolls 13, into contact with the polyalkyl silicone coating on the glass cloth. The polyethylene films were securely adhered together to form a homogeneous film 16 and rolled up.

This apparatus is adapted for the same uses as the apparatus of Figure 2.

There is shown in Figure 4 a heat-sealer for use for sealing the tops of filled bags or tubes. Two calender rolls 20 arranged vertically were coated with polyalkyl silicone. This composition is soft and flexible and resistant to temperatures as high as 175 to 200° C.

Filled bags, formed of cellophane 22 coated on the inside surface only with a moistureproofing composition 23 of polyvinyl butyral, were heat-sealed by placing the top of the bag in the nip of the rollers 20 as illustrated in the figure. These bags had been formed with an overlapping seal on one side thus giving an uneven top seal. However, an excellent union was obtained which was strongly resistant to tearing or rupture. No creases were obtained in the top of the bag because the polyalkyl silicone coating on the calender rolls accommodated itself to the uneven thickness of the top of the bag.

In each of the examples and figures, coated sheets were shown in which the coating appeared on one side only. It will be understood, however, that sheets carrying a thermoplastic coating on both surfaces may be employed.

Because of the high heat-sealing temperatures which may be employed in the various apparatus of the invention, it is possible to seal sheet materials formed of, or coated with, a thermosetting synthetic resin in a thermoplastic stage and at the same time convert the thermoplastic resin to a nonthermoplastic stage. Thus, an extremely strong seal may be obtained due to interpolymerization of the thermosetting resin on or in both sheets being sealed during the heat-sealing operation. This is illustrated in the following example.

EXAMPLE IV

A paper bag coated on both surfaces with a wax-urea-formaldehyde resin composition, the urea-formaldehyde resin being in a thermoplastic incompletely polymerized stage, was sealed at the top using the apparatus of Figure 1. The heat-sealing element was heated at a temperature of 135° C. The bag was subjected to heat and pressure in the apparatus for 10 minutes. During this period the urea-formaldehyde resin in the coatings on either side of the bag not only fused together to form a good seal but also interpolymerized to a nonthermoplastic stage. The joint obtained was extremely strong and could not be broken; when attempts were made to break the seal, the paper tore instead.

The process and apparatus of the invention are applicable to sealing, laminating, transferring, labeling, bag making, wrapping, packaging, and other operations requiring the uniting of sheets formed of, or coated with, thermoplastic materials to itself or other materials.

Having described my invention, what I claim as new and desire to secure by Letters Patent is:

1. An apparatus for heat-sealing a sheet to itself or other materials comprising, in combination, a heat-sealing element, means for heating the element, and a film comprising an elastic polyorganosiloxane having a softening point above about 150° C. and a retention of compressibility at temperatures of approximately 175° C. for a period of at least 100 hours, said film being disposed in contact with the sealing surface of the heat-sealing element and having been cured for one hour at 80° C., one hour at 90° C., 2 to 4 hours at 110–130° C. and 24 hours at 150° C.

2. An apparatus as in claim 1, wherein the film of elastic polyorganosiloxane is disposed over and affixed to the sealing surface of the heat-sealing element.

3. Apparatus as in claim 1, wherein the film of elastic polyorganosiloxane is a coating on a fibrous web, and comprising means for continuously passing the coated web in contact with the sealing surface of the heat-sealing element.

4. Apparatus as in claim 1, wherein the film of elastic polyorganosiloxane is a coating on a glass cloth, and comprising means for continuously passing the coated cloth in contact with the sealing surface of the heat-sealing member.

5. An apparatus for heat-sealing a sheet to itself or other materials comprising, in combination, a heat-sealing element, means for heating the element, and a film comprising an elastic polyalkyl silicone having a softening point above about 150° C. and a retention of compressibility at a temperature of approximately 175° C. for a period of at least 100 hours disposed in contact with the sealing surface of the heat-sealing element.

6. A process for heat-sealing a sheet to itself or other materials comprising, in combination, the steps of disposing a film of an elastic polyalkyl silicone having a softening point above about 150° C. and a retention of compressibility at a temperature of approximately 175° C. for a period of at least 100 hours in contact with the sealing surface of a heat-sealing element, and continuously passing the sheet to be sealed in contact with the film, while simultaneously applying heat and pressure to the film and to the sheet to be sealed, through the film.

7. A process of heating sealing a sheet to itself or other materials comprising continuously passing the sheet to be sealed in contact with a film of polyorganosiloxane while simultaneously applying heat and pressure to the film and to the sheet to be sealed, through the film, said film of polyorganosiloxane having been formed by curing for one hour at 80° C., one hour at 90° C., 2 to 4 hours at 110–130° C. and 24 hours at 150° C., the resultant film having a softening point above about 150° C. and a retention of compressibility at temperatures of approximately 175° C. for a period of at least 100 hours.

JOSEPH ALFRED ANGLADA.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,222 | Rochow | Oct. 7, 1941 |
| 2,412,470 | Norton | Dec. 10, 1946 |
| 2,424,558 | Delano | July 29, 1947 |